(12) United States Patent
Goleski

(10) Patent No.: US 9,435,403 B2
(45) Date of Patent: Sep. 6, 2016

(54) MULTI-SPEED TRANSMISSION

(71) Applicant: FORD GLOBAL TECHNOLOGIES, LLC, Dearborn, MI (US)

(72) Inventor: Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 13/771,660

(22) Filed: Feb. 20, 2013

(65) Prior Publication Data

US 2014/0235399 A1    Aug. 21, 2014

(51) Int. Cl.
F16H 3/58   (2006.01)
F16H 37/04  (2006.01)
F16H 3/62   (2006.01)
F16H 3/66   (2006.01)

(52) U.S. Cl.
CPC ........ *F16H 3/62* (2013.01); *F16H 3/66* (2013.01); *F16H 2200/0065* (2013.01); *F16H 2200/2012* (2013.01); *F16H 2200/2046* (2013.01)

(58) Field of Classification Search
CPC ............... F16H 2200/0065; F16H 2200/2007; F16H 2200/2046; F16H 3/58; F16H 3/62; F16H 3/66; F16H 3/442; F16H 37/04; F16H 37/042; F16H 2200/20976
USPC ........ 475/207, 218, 219, 269, 271, 323, 343
See application file for complete search history.

(56) References Cited

U.S. PATENT DOCUMENTS

| | | | |
|---|---|---|---|
| 2,853,890 A * | 9/1958 | Kelbel | B60K 17/3505 180/23 |
| 3,190,147 A * | 6/1965 | Livingston | 475/218 |
| 4,420,992 A * | 12/1983 | Windish | 475/118 |
| 4,683,776 A | 8/1987 | Kiemen | |
| 4,788,887 A * | 12/1988 | Lepelletier | 475/52 |
| 4,924,729 A * | 5/1990 | Sherman | F16H 3/54 475/207 |
| 6,176,803 B1 | 1/2001 | Meyer et al. | |
| 6,955,627 B2 | 10/2005 | Thomas et al. | |
| 6,960,149 B2 | 11/2005 | Ziemer | |
| 7,163,484 B2 | 1/2007 | Klemen | |
| 7,276,011 B2 * | 10/2007 | Tabata et al. | 475/276 |
| 7,635,315 B2 | 12/2009 | Kamm et al. | |
| 7,878,941 B2 * | 2/2011 | Hukill et al. | 475/323 |
| 7,985,160 B2 * | 7/2011 | Jang | F16H 3/66 475/275 |
| 7,998,013 B2 | 8/2011 | Phillips et al. | |
| 8,016,708 B2 | 9/2011 | Diosi et al. | |
| 8,052,566 B2 | 11/2011 | Wittkopp et al. | |
| 8,052,567 B2 | 11/2011 | Hart et al. | |
| 8,113,984 B2 | 2/2012 | Wittkopp et al. | |

(Continued)

OTHER PUBLICATIONS

H. Benford, M. Leising, The Lever Analogy: A New Tool in Transmission Analysis, 1982, Society of Automotive Engineers, Inc. 810102, p. 429-437.

*Primary Examiner* — Jacob S Scott
*Assistant Examiner* — Tinh Dang
(74) *Attorney, Agent, or Firm* — James Dottavio; Brooks Kushman P.C.

(57) ABSTRACT

A transmission gearing arrangement produces at least nine forward speed ratios and one reverse speed ratio by selective engagement of three shift elements in various combinations. One embodiment includes four simple planetary gear sets, three clutches, and three brakes. Another embodiment includes four axis transfer gear pairs, two simple planetary gear sets, five clutches, and one brake.

24 Claims, 2 Drawing Sheets

(56) References Cited

U.S. PATENT DOCUMENTS

| | | | |
|---|---|---|---|
| 8,177,674 B2 | 5/2012 | Baldwin | |
| 8,187,139 B2 | 5/2012 | Baldwin | |
| 8,210,982 B2 | 7/2012 | Gumpoltsberger et al. | |
| 8,231,495 B2 | 7/2012 | Gumpoltsberger et al. | |
| 8,231,501 B2 | 7/2012 | Gumpoltsberger et al. | |
| 8,241,171 B2* | 8/2012 | Gumpoltsberger et al. | 475/284 |
| 8,246,504 B2 | 8/2012 | Gumpoltsberger et al. | |
| 8,251,859 B2 | 8/2012 | Gumpoltsberger et al. | |
| 8,287,420 B2 | 10/2012 | Gumpoltsberger et al. | |
| 8,303,455 B2 | 11/2012 | Gumpoltsberger et al. | |
| 8,398,522 B2 | 3/2013 | Bauknecht et al. | |
| 8,403,803 B2 | 3/2013 | Gumpoltsberger et al. | |
| 8,425,370 B2 | 4/2013 | Leesch et al. | |
| 8,496,556 B2* | 7/2013 | Wittkopp et al. | 475/269 |
| 2008/0108473 A1* | 5/2008 | Shim | 475/276 |
| 2010/0035718 A1* | 2/2010 | Saitoh | 475/271 |
| 2011/0009228 A1 | 1/2011 | Bauknecht et al. | |
| 2011/0009229 A1 | 1/2011 | Bauknecht et al. | |
| 2011/0045936 A1 | 2/2011 | Gumpoltsberger et al. | |
| 2011/0045937 A1 | 2/2011 | Gumpoltsberger et al. | |
| 2011/0045938 A1 | 2/2011 | Gumpoltsberger et al. | |
| 2011/0045939 A1 | 2/2011 | Gumpoltsberger et al. | |
| 2011/0045940 A1 | 2/2011 | Gumpoltsberger et al. | |
| 2011/0045941 A1 | 2/2011 | Gumpoltsberger et al. | |
| 2011/0045942 A1* | 2/2011 | Gumpoltsberger | F16H 3/66 475/275 |
| 2011/0045943 A1 | 2/2011 | Gumpoltsberger et al. | |
| 2011/0300983 A1* | 12/2011 | Kurokawa | 475/5 |
| 2012/0071289 A1 | 3/2012 | Wittkopp et al. | |
| 2012/0100952 A1* | 4/2012 | Wittkopp et al. | 475/219 |
| 2012/0115671 A1 | 5/2012 | Gumpoltsberger et al. | |
| 2012/0115672 A1 | 5/2012 | Gumpoltsberger et al. | |
| 2012/0122626 A1 | 5/2012 | Gumpoltsberger et al. | |
| 2012/0122627 A1 | 5/2012 | Gumpoltsberger et al. | |
| 2012/0135834 A1 | 5/2012 | Gumpoltsberger et al. | |
| 2012/0135835 A1 | 5/2012 | Gumpoltsberger et al. | |
| 2012/0142486 A1 | 6/2012 | Gumpoltsberger et al. | |
| 2012/0149526 A1 | 6/2012 | Gumpoltsberger et al. | |
| 2012/0157259 A1* | 6/2012 | Phillips | 475/296 |
| 2012/0165153 A1 | 6/2012 | Borgerson et al. | |
| 2012/0165154 A1* | 6/2012 | Wittkopp | F16H 3/663 475/296 |
| 2012/0172173 A1 | 7/2012 | Wittkopp et al. | |
| 2013/0196813 A1* | 8/2013 | Oita et al. | 475/284 |
| 2013/0196814 A1* | 8/2013 | Gumpoltsberger et al. | 475/284 |
| 2013/0274059 A1* | 10/2013 | Beck et al. | 475/276 |
| 2014/0051542 A1* | 2/2014 | Baek et al. | 475/284 |
| 2014/0087910 A1* | 3/2014 | Thomas et al. | 475/269 |

\* cited by examiner

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

A transmission includes first though fifth shafts, first through fourth gearing arrangements, a first brake, and first and second clutches. The first gearing arrangement selectively overdrives the first shaft with respect to the fourth shaft. The second gearing arrangement imposes a fixed linear speed relationship among the first, second, and third shafts. The third gearing arrangement selectively imposes a linear speed relationship among the third, fourth, and fifth shafts. The fourth gearing arrangement selectively overdrives the third shaft with respect to the fifth shaft. The first brake selectively holds the second shaft against rotation while the first clutch selectively couples the second shaft to the fourth shaft. Finally, the second shaft selectively couples the first shaft to the third shaft.

In one embodiment, the fourth shaft is an input shaft and the first gearing arrangement includes a first simple planetary gear set and a second brake. The input shaft is fixedly coupled to the planet carrier, the ring gear is fixedly coupled to the first shaft, and the second brake selectively holds the sun gear against rotation. In another embodiment, the input shaft is offset from the fourth shaft. One gear pair fixedly constrains the speed of the fourth shaft to be proportional to the speed of the input shaft and in the opposite direction. A fourth clutch and second gear pair selectively constrains the speed of the first shaft to be proportional to the speed of the input shaft and in the opposite direction. The relative sizes of gears in the two gear pairs are selected to constrain the first shaft to rotate faster than the fourth shaft when the fourth clutch is engaged.

The second gearing arrangement may be a second simple planetary gear set. The sun gear is fixedly coupled to the first shaft, the carrier is fixedly coupled to the second shaft, and the ring gear is fixedly coupled to the third shaft. In one embodiment, the second clutch directly couples the first shaft to the third shaft. In another embodiment, the second clutch operatively couples the first shaft to the third shaft by directly coupling the second shaft to the third shaft, thereby constraining all of the elements of the second simple planetary gear set to rotate as a unit.

The third gearing arrangement may include a third simple planetary gear set and a third clutch. In one embodiment, the sun gear is fixedly coupled to the third shaft, the carrier is fixedly coupled to the fourth shaft, and the third clutch selectively couples the ring gear to the fifth shaft. In another embodiment, the sun gear is fixedly coupled to the third shaft, the third clutch selectively couples the carrier to the fourth shaft, and the ring gear is fixedly coupled to the fifth shaft.

In one embodiment, the fifth shaft is an output shaft and the fourth gearing arrangement includes a fourth simple planetary gear set and a third brake. The output shaft is fixedly coupled to the planet carrier, the sun gear is fixedly coupled to the third shaft, and the third brake selectively holds the ring gear against rotation. In another embodiment, the output shaft is offset from the fifth shaft. A third gear pair fixedly constrains the speed of the fifth shaft to be proportional to the speed of the output shaft and in the opposite direction. A fifth clutch and fourth gear pair selectively constrains the speed of the fifth shaft to be proportional to the speed of the output shaft and in the opposite direction. The relative sizes of gears in the third and fourth gear pairs are selected to constrain the third shaft to rotate faster than the fifth shaft when the fifth clutch is engaged.

DETAILED DESCRIPTION

Figure 1:
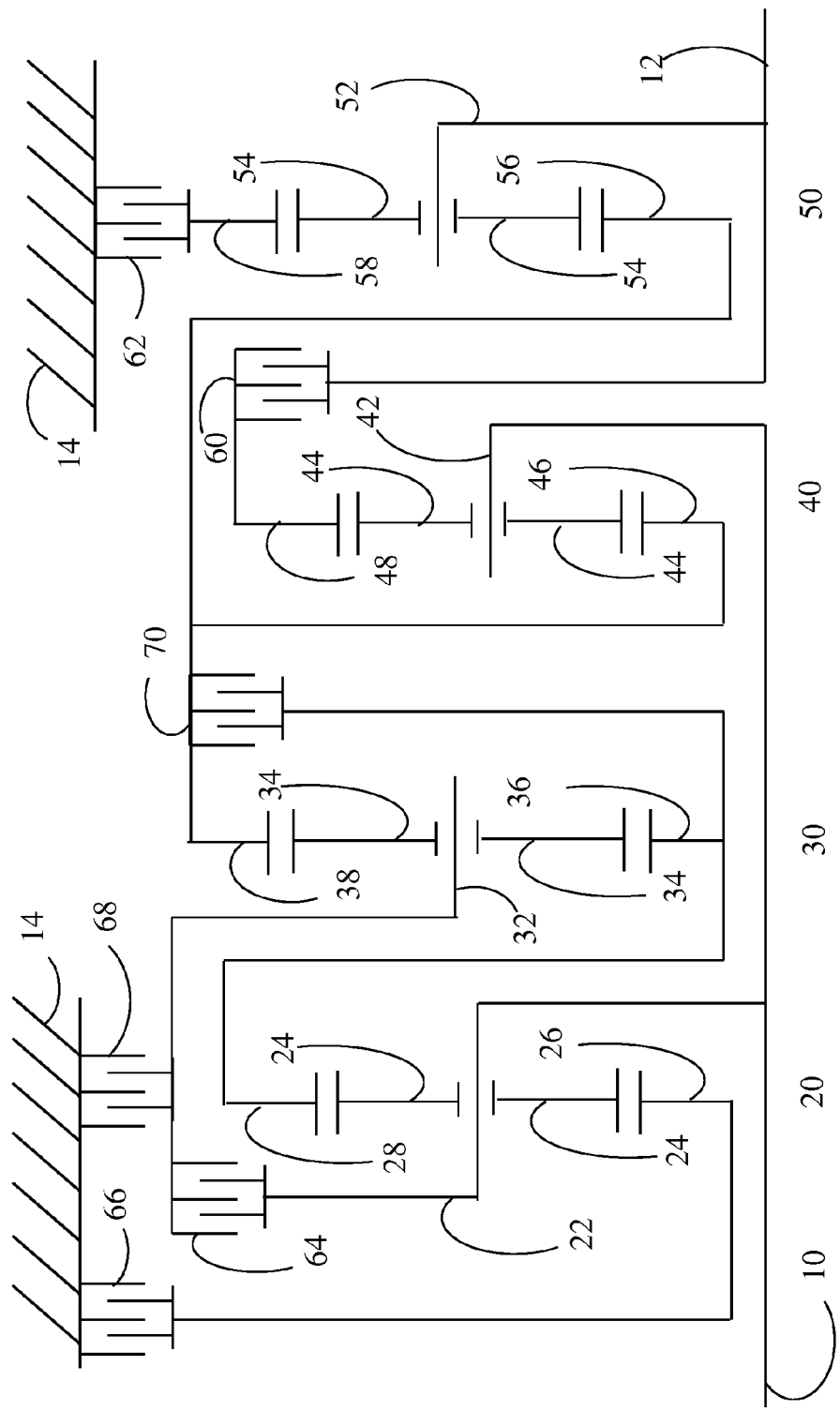
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

A suggested ratio of gear teeth for each planetary gear set is listed in Table 1.

TABLE 1

| Ring 28/Sun 26 | 1.70 |
| Ring 38/Sun 36 | 1.75 |
| Ring 48/Sun 46 | 3.50 |
| Ring 58/Sun 56 | 2.00 |

In the transmission of FIG. 1, carriers 22 and 42 are fixedly coupled to input shaft 10, ring gear 28 is fixedly coupled to sun gear 36, ring gear 38 is fixedly coupled to sun gears 46 and 56, and output shaft 12 is fixedly coupled to carrier 52. Sun gear 26 is selectively held against rotation by brake 66. Carrier 32 is selectively held against rotation by brake 68 and selectively coupled to carrier 22 by clutch 64. Sun gear 36 is selectively coupled to ring gear 38 by clutch 70. Ring gear 58 is selectively held against rotation by brake 62. Finally, output shaft 12 and carrier 52 are selectively coupled to ring gear 48 by clutch 60.

Various combinations of gear sets, clutches, and brakes selectively impose particular speed relationships. The combination of gear set 20 and brake 66 selectively imposes an overdrive relationship between input shaft 10 and sun gear 36. In other words, when brake 66 is engaged, sun gear 36 is constrained to rotate faster than the input shaft and in the same direction. The combination of gear set 30 and clutch 70 selectively operatively couples sun gear 36, carrier 32, and ring gear 38. The same speed relationship would be imposed if clutch 70 directly coupled carrier 32 to either sun gear 36 or ring gear 38. The combination of gear set 40 and clutch 60 selectively imposes linear speed relationship among sun gear 46, input shaft 10, and output shaft 12. Finally, the combination of gear set 50 and brake 62 selectively imposes an overdrive relationship between output shaft 12 and ring gear 38.

As shown in Table 2, engaging the shift elements in combinations of three establishes nine forward speed ratios and one reverse speed ratio between input shaft 10 and output shaft 12. An X indicates that the shift element is required to establish the speed ratio. An (X) indicates the clutch can be applied but is not required. In 4th gear, clutch 60 and brake 62 establish the power flow path between input shaft 10 and output shaft 12. Any one of the remaining shift elements can also be applied. Applying clutch 70 ensures that all single and two step shifts from 4th gear can be accomplished by engaging only one shift element and releasing only one shift element. When the gear sets have tooth numbers as indicated in Table 1, the speed ratios have the values indicated in Table 2.

TABLE 2

|  | 60 | 62 | 64 | 66 | 68 | 70 | Ratio | Step |
|---|---|---|---|---|---|---|---|---|
| Rev |  | X |  | X | X |  | -3.31 | 73% |
| $1^{st}$ |  | X | X | X |  |  | 4.52 |  |
| $2^{nd}$ |  | X | X |  |  | X | 3.00 | 1.51 |
| $3^{rd}$ |  | X |  | X |  | X | 1.89 | 1.59 |
| $4^{th}$ | X | X |  |  |  | (X) | 1.44 | 1.31 |
| $5^{th}$ | X |  |  | X |  | X | 1.20 | 1.20 |
| $6^{th}$ | X |  | X |  |  | X | 1.00 | 1.20 |
| $7^{th}$ | X |  | X | X |  |  | 0.91 | 1.10 |
| $8^{th}$ | X |  |  |  | X | X | 0.78 | 1.17 |
| $9^{th}$ | X |  |  | X | X |  | 0.65 | 1.20 |

Figure 2:
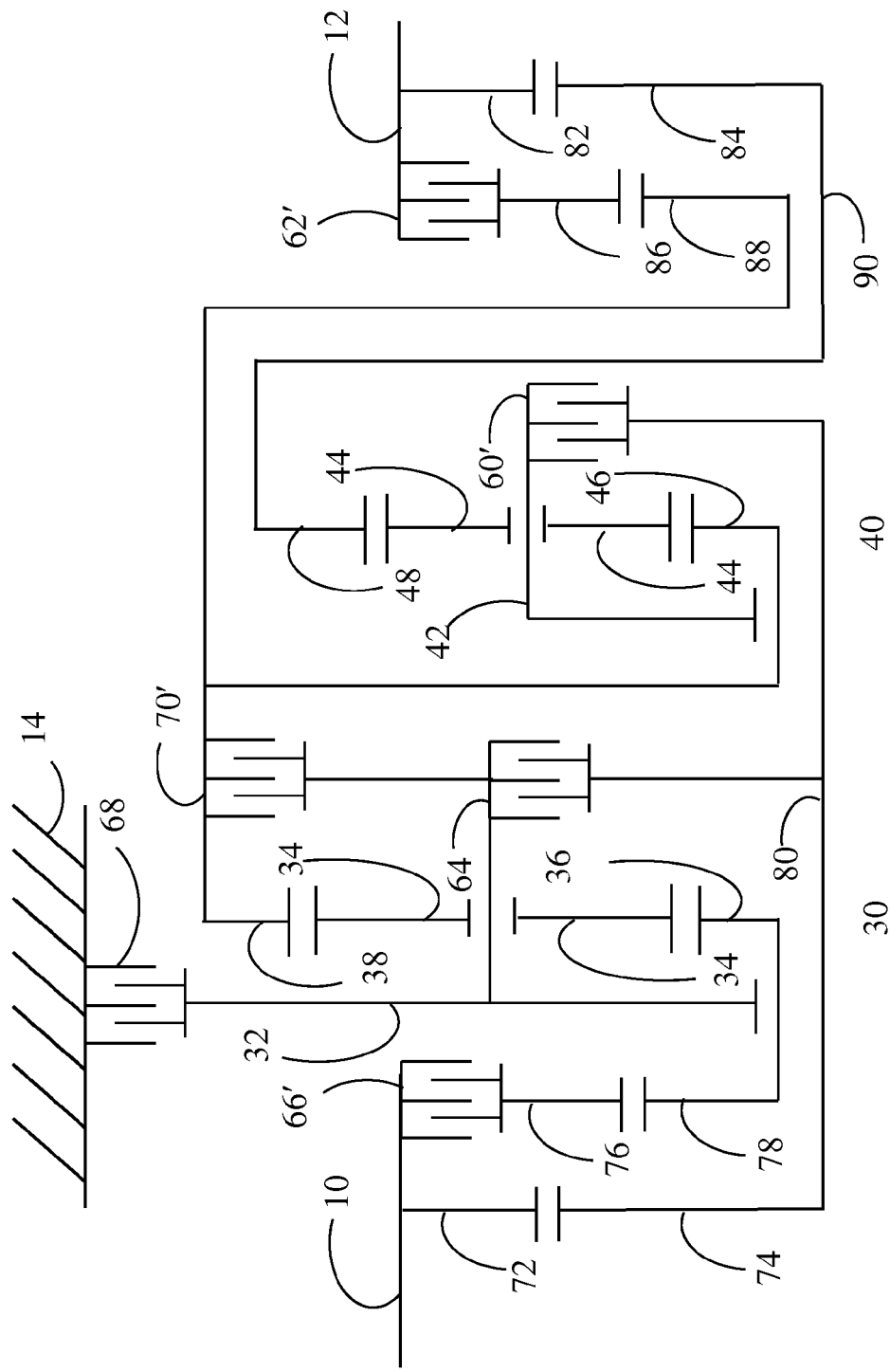
FIG. 2 is a schematic diagram of a second transmission gearing arrangement.

A second example transmission is illustrated in FIG. 2. This transmission utilizes two simple planetary gear sets 30 and 40. Both simple planetary gear sets have a sun gear, a ring gear, and a carrier that rotate about a central axis. Additionally, axis transfer gears 74, 78, 84, and 88 are supported for rotation about this central axis. Gear 74 is radially larger than gear 78 gear 84 is radially larger than gear 88. Sun gear 36 is fixedly coupled to axis transfer gear 78. Ring gear 38 and sun gear 46 are fixedly coupled to axis transfer gear 88. Ring gear 48 is fixedly coupled to axis transfer gear 84 and intermediate shaft 90. Axis transfer gear 74 is fixedly coupled to intermediate shaft 80. Carrier 32 is selectively coupled to ring gear 38 by clutch 70' and selectively held against rotation by brake 68. Intermediate shaft 80 is selectively coupled to carrier 32 by clutch 64 and selectively coupled to carrier 42 by clutch 60'. Input shaft 10 and output shaft 12 rotate about axes that are parallel to the central axes but displaced. Input shaft 10 and output shaft 12 may be co-axial with one another or may rotate about different axes. Axis transfer gear 72 is fixedly coupled to input shaft 10 and continuously meshes with axis transfer gear 74. Axis transfer gear 76 is selectively coupled to input shaft 10 by clutch 66' and continuously meshes with axis transfer gear 78. Similarly, axis transfer gear 82 is fixedly coupled to output shaft 12 and continuously meshes with axis transfer gear 84. Axis transfer gear 86 is selectively coupled to output shaft 12 by clutch 62' and continuously meshes with axis transfer gear 88.

Various combinations of gear sets, axis transfer gears, clutches, and brakes selectively impose particular speed relationships. The combination of axis transfer gears 72, 74, 76, 78 and clutch 66' selectively imposes an overdrive relationship between intermediate shaft 80 and sun gear 36. The combination of gear set 30 and clutch 70' selectively operatively couples sun gear 36, carrier 32, and ring gear 38. The combination of axis transfer gears 72, 74, 76, 78, planetary gear set 30, clutches 64, 66', 70', and brake 68 impose a variety of speed ratios between shaft 80 and ring gear 38. In particular, when clutch 66' and brake 68 are both engaged, the elements rotate in opposite directions. When clutch 70' and brake 68 are both engaged, ring gear 38 is held stationary. In other words, the speed ratio between ring gear 38 and shaft 80 is zero. When clutches 64 and 66' are both engaged, ring 38 rotates slower than shaft 80 and in the same direction. When clutches 64 and 70' are both engaged, a direct drive relationship is establishes. Finally, when clutches 66' and 70' are both engaged, ring 38 rotates faster than shaft 80 and in the same direction. The combination of gear set 40 and clutch 60' selectively imposes linear speed relationship among sun gear 46, intermediate shaft 80, and axis transfer gear 84. Finally, the combination of axis transfer gears 82, 84, 86, 88 and clutch 62' selectively imposes an overdrive relationship between intermediate shaft 90 and ring gear 38.

As shown in Table 3, engaging the shift elements in combinations of three establishes nine forward speed ratios and one reverse speed ratio between input shaft 10 and output shaft 12.

TABLE 3

|     | 60' | 62' | 64 | 66' | 68 | 70' |
|-----|-----|-----|----|----|----|----|
| Rev |     | X   |    | X  | X  |    |
| 1st |     | X   | X  | X  |    |    |
| 2nd |     | X   | X  |    |    | X  |
| 3rd |     | X   |    | X  |    | X  |
| 4th | X   | X   |    |    |    | (X) |
| 5th | X   |     |    | X  |    | X  |
| 6th | X   |     | X  |    |    | X  |
| 7th | X   |     | X  | X  |    |    |
| 8th | X   |     |    |    | X  | X  |
| 9th | X   |     |    | X  | X  |    |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   first, second, third, fourth, and fifth shafts;
   a first gearing arrangement configured to selectively constrain the first shaft to rotate faster than the fourth shaft and in a same direction;
   a second gearing arrangement configured to fixedly impose a linear speed relationship among the first shaft, the second shaft, and the third shaft;
   a third gearing arrangement configured to selectively impose a linear speed relationship among the third shaft, the fourth shaft, and the fifth shaft;
   a fourth gearing arrangement configured to selectively constrain the third shaft to rotate faster than the fifth shaft and in a same direction;
   a first brake configured to selectively hold the second shaft against rotation;
   a first clutch configured to selectively couple the second shaft to the fourth shaft; and
   a second clutch configured to operatively selectively couple the first shaft, the second shaft, and the third shaft to one another.

2. The transmission of claim 1 wherein the fourth shaft is an input shaft.

3. The transmission of claim 2 wherein the first gearing arrangement comprises:
   a first simple planetary gear set having a first sun gear, a first ring gear fixedly coupled to the first shaft, a first planet carrier fixedly coupled to the input shaft, and at least one planet gear supported for rotation on the first planet carrier and in continuous meshing engagement with the first sun gear and the first ring gear; and
   a second brake configured to selectively hold the first sun gear against rotation.

4. The transmission of claim 1 wherein the first gearing arrangement comprises:
   a sixth shaft;
   a first gear coupled to the fourth shaft;
   a second gear coupled to the sixth shaft and in continuous meshing engagement with the first gear;
   a third gear coupled to the first shaft; and
   a fourth gear coupled to the sixth shaft and in continuous meshing engagement with the third gear.

5. The transmission of claim 4 wherein the first gearing arrangement further comprises:
   a fourth clutch configured to selectively couple the sixth shaft to the fourth gear; and
   wherein the first, second, and third gears are fixedly coupled to the fourth, sixth, and first shafts, respectively.

6. The transmission of claim 4 wherein the sixth shaft is an input shaft.

7. The transmission of claim 1 wherein the second gearing arrangement comprises:
   a second simple planetary gear set having a second sun gear fixedly coupled to the first shaft, a second ring gear fixedly coupled to the third shaft, a second planet carrier fixedly coupled to the second shaft, and at least one planet gear supported for rotation on the second planet carrier and in continuous meshing engagement with the second sun gear and the second ring gear.

8. The transmission of claim 7 wherein the second clutch is configured to directly couple the first shaft to the third shaft.

9. The transmission of claim 7 wherein the second clutch is configured to directly couple the second shaft to the third shaft.

10. The transmission of claim 1 wherein the third gearing arrangement comprises:
a third simple planetary gear set having a third sun gear fixedly coupled to the third shaft, a third ring gear, a third planet carrier fixedly coupled to the fourth shaft, and at least one planet gear supported for rotation on the third planet carrier and in continuous meshing engagement with the third sun gear and the third ring gear; and
a third clutch configured to selectively couple the fifth shaft to the third ring gear.

11. The transmission of claim 1 wherein the third gearing arrangement comprises:
a third simple planetary gear set having a third sun gear fixedly coupled to the third shaft, a third ring gear fixedly coupled to the third shaft, a third planet carrier, and at least one planet gear supported for rotation on the third planet carrier and in continuous meshing engagement with the third sun gear and the third ring gear; and
a third clutch configured to selectively couple the fourth shaft to the third planet carrier.

12. The transmission of claim 1 wherein the fifth shaft is an output shaft.

13. The transmission of claim 12 wherein the fourth gearing arrangement comprises:
a fourth simple planetary gear set having a fourth sun gear fixedly coupled to the third shaft, a fourth ring gear, a fourth planet carrier fixedly coupled to the output shaft, and at least one planet gear supported for rotation on the fourth planet carrier and in continuous meshing engagement with the fourth sun gear and the fourth ring gear; and
a third brake configured to selectively hold the fourth ring gear against rotation.

14. The transmission of claim 1 wherein the fourth gearing arrangement comprises:
a seventh shaft;
a fifth gear coupled to the fifth shaft;
a sixth gear coupled to the seventh shaft and in continuous meshing engagement with the fifth gear;
a seventh gear coupled to the third shaft; and
an eighth gear coupled to the seventh shaft and in continuous meshing engagement with the seventh gear.

15. The transmission of claim 14 wherein the fourth gearing arrangement further comprises:
a fifth clutch configured to selectively couple the seventh shaft to the eighth gear; and
wherein the fifth, sixth, and seventh gears are fixedly coupled to the fifth, seventh, and third shafts, respectively.

16. The transmission of claim 14 wherein the seventh shaft is an output shaft.

17. A transmission comprising:
first, second, and third shafts;
an output shaft;
a first gearing arrangement configured to alternately selectively establish a plurality of speed ratios between the second shaft and the first shaft;
a second gearing arrangement configured to selectively impose a linear speed relationship among the second shaft, the first shaft, and the third shaft;
a first gear fixedly coupled to the third shaft;
a second gear fixedly coupled to the output shaft and in continuous meshing engagement with the first gear;
a third gear coupled to the second shaft; and
a fourth gear coupled to the output shaft and in continuous meshing engagement with the third gear.

18. The transmission of claim 17 further comprising: a clutch configured to selectively couple the output shaft to the fourth gear; and
wherein the third gear is fixedly coupled to the second shaft.

19. The transmission of claim 17 wherein the first shaft is constrained to rotate at a speed proportional to an input shaft.

20. The transmission of claim 17 wherein the plurality of speed ratios includes a speed ratio between zero and one.

21. The transmission of claim 20 wherein the plurality of speed ratios includes a direct drive speed ratio.

22. The transmission of claim 21 wherein the plurality of speed ratios includes a ratio greater than one.

23. The transmission of claim 21 wherein the plurality of speed ratios includes a negative speed ratio.

24. The transmission of claim 21 wherein the plurality of speed ratios includes a zero speed ratio.

\* \* \* \* \*